United States Patent
Qiu et al.

(10) Patent No.: US 12,113,190 B2
(45) Date of Patent: Oct. 8, 2024

(54) THERMAL RESPONSIVE ELECTRODE STRUCTURE FOR LITHIUM-ION BATTERIES

(71) Applicant: Nano and Advanced Materials Institute Limited, Hong Kong (HK)

(72) Inventors: Zhengfu Qiu, Hong Kong (HK); Wing Lung Hon, Hong Kong (HK); Yuen Yung Chan, Hong Kong (HK); Cheuk Yin Lee, Hong Kong (HK); Shengbo Lu, Hong Kong (HK); Chi Ho Kwok, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 277 days.

(21) Appl. No.: 17/521,864

(22) Filed: Nov. 9, 2021

(65) Prior Publication Data
US 2022/0166085 A1 May 26, 2022

Related U.S. Application Data

(60) Provisional application No. 63/116,929, filed on Nov. 23, 2020.

(51) Int. Cl.
*H01M 10/65* (2014.01)
*H01M 4/04* (2006.01)
(Continued)

(52) U.S. Cl.
CPC ....... *H01M 10/653* (2015.04); *H01M 4/0404* (2013.01); *H01M 10/0525* (2013.01); *H01M 10/654* (2015.04)

(58) Field of Classification Search
CPC ............. H01M 10/653; H01M 4/0404; H01M 10/0525; H05K 5/0209; C08L 2201/00; C08J 7/05
See application file for complete search history.

(56) References Cited

U.S. PATENT DOCUMENTS

| | | | |
|---|---|---|---|
| 8,871,385 B2 * | 10/2014 | Gering | H01M 4/0404 29/623.1 |
| 10,090,501 B2 * | 10/2018 | Hong | H01M 50/434 |

(Continued)

FOREIGN PATENT DOCUMENTS

| | | | |
|---|---|---|---|
| CN | 109980162 A | 7/2019 | |
| JP | 2013054969 A * | 3/2013 | ........ H01M 10/0525 |

OTHER PUBLICATIONS

Mustapha El Gouri, Abderrahim El Bachiri, Salah Eddine Hegazi, Mohamed Rafik, Ahmed El Harfi, Thermal degradation of a reactive flame retardant based on cyclotriphosphazene and its blend with DGEBA epoxy resin, Polymer Degradation and Stability, vol. 94, Issue 11, (Year: 2009).*

(Continued)

*Primary Examiner* — James M Erwin
*Assistant Examiner* — Ziheng Lu
(74) *Attorney, Agent, or Firm* — Idea Intellectual Limited; Margaret A. Burke; Sam T. Yip (57) ABSTRACT

The present invention provides a thermally-decomposable consolidated polymer particle encapsulated-electrode for a lithium-ion battery. The electrode includes polymer particles including at least one connection unit and at least one crosslinker in an amount of approximately 40% to 98% by weight and at least one binder material in an amount of approximately from 2% to 60% by weight. The consolidated crosslinked polymer particle coating results in a porous structure encapsulating the electrode. The pressure resistance of the consolidated crosslinked polymer particle coat- (Continued)

ing ranges approximately from 0.5 to 8 MPa and the consolidated crosslinked polymer particle coating is decomposed to release a non-flammable gas and phosphorous-containing molecules so as to prevent thermal runaway at a temperature approximately from 300° C. to 500° C.

12 Claims, 10 Drawing Sheets

(51) Int. Cl.
    *H01M 10/0525*     (2010.01)
    *H01M 10/653*     (2014.01)
    *H01M 10/654*     (2014.01)

(56) References Cited

U.S. PATENT DOCUMENTS

| | | | |
|---|---|---|---|
| 10,381,690 B2* | 8/2019 | Nam | H01M 4/628 |
| 2011/0311855 A1* | 12/2011 | Peng | H01M 50/423 |
| | | | 427/466 |
| 2015/0228994 A1* | 8/2015 | Toshinari | C08J 5/2231 |
| | | | 429/492 |
| 2020/0020981 A1* | 1/2020 | Liu | H01M 4/587 |
| 2020/0083507 A1* | 3/2020 | Kaye | H01M 4/525 |

OTHER PUBLICATIONS

Thermochemistry of Sulfones Relevant to Oxidative Desulfurization, Roman Weh and Arno de Klerk, Energy & Fuels 2017 31 (6), 607-6614, DOI: 10.1021/acs.energyfuels.7b00585 (Year: 2017).*
Qingsong Wang, et al. "Progress of enhancing the safety of lithium ion battery from the electrolyte aspect.", Nano Energy(2019), 93-114, https://doi.org/10.1016/j.nanoen.2018.10.035.
Laura Bravo Diaz, et al., "Review—Meta-Review of Fire Safety of Lithium-Ion Batteries: Industry Challenges and Research Contributions.", Journal of The Electrochemical Society, 2020, 167: 090559-090573.
Ahmed Abaza, et al. "Experimental study of internal and external short circuits of commercial automotive pouch lithium-ion cells.", Journal of Energy Storage 16(2018), 211-217.
Alex Friesen, et al. "Al2O3 coating on anode surface in lithium ion batteries: Impact on low temperature cycling and safety behavior.", Journal of Power Sources 363(2017), 70-77.

* cited by examiner

THERMAL RESPONSIVE ELECTRODE STRUCTURE FOR LITHIUM-ION BATTERIES

CROSS-REFERENCE TO RELATED APPLICATIONS

The present application claims priority from the U.S. provisional patent application Ser. No. 63/116,929 filed Nov. 23, 2020, and the disclosure of which is incorporated by reference in its entirety.

FIELD OF THE INVENTION

The present invention relates to an electrode structure for a lithium-ion battery, in particular with polymer microspheres embedded in the nanofiber network for fire and thermal runaway prevention at a predetermined temperature.

BACKGROUND

With the rapid development of portable electronic devices and electric vehicles, lithium-ion batteries have dominated in the market for last decade. However, the development of current lithium-ion batteries is encountering safety issues such as: thermal runaway (TR) and TR-induced smoke, fire and explosion, which has been recognized as the major causes among the accidents of lithium-ion battery.

Abuse conditions are the main sources for TR including mechanical abuse (crush, penetration and drop, etc.), electrochemical abuse (short-circuit, overcharge and over-discharge, etc.), and thermal abuse (fire, thermal shock, and overheat, etc.). When the abuse is over the tolerance, it would initiate the thermal runaway to an unstoppable chain reaction. The temperature raises rapidly within milliseconds and the energy stored is suddenly released, which is able to induce a number of exothermic reactions including decomposition of the solid electrolyte interface (SEI) layer, oxidative/reductive decomposition of organic electrolytes at the anode/cathode surface, separator melt-down and the thermal decomposition of the material at the cathode. Meanwhile, a sharp increase in the internal pressure will also build up and more heat would add up, which in turn burns the electrolyte and ignites fire.

Therefore, there is a need in the art for a new type of design for the electrode structure of lithium batteries which is able to react immediately and to hinder the thermal runaway reaction in a short time period.

SUMMARY OF THE INVENTION

This section aims to summarize some aspects of the embodiments of the present invention and to briefly describe some preferred embodiments. The simplification or omission may be made in this section, the abstract of the specification, and the title to avoid obscuring the purpose of this section, the abstract of the specification, and the title. Such simplification or omission may not be used to limit the scope of the present invention.

Accordingly, a first aspect of the present invention provides a thermally-decomposable consolidated polymer particle encapsulated-electrode for a lithium-ion battery. The thermally-decomposable consolidated polymer particle encapsulated-electrode includes an electrode selected from a cathode, an anode, at least one binder material, and a consolidated crosslinked polymer particle coating forming a porous structure encapsulating the electrode. The polymer particles with the diameter approximately from 0.05 μm to 8 μm include at least one connection unit and at least one crosslinker having an amount of approximately from 25% to 50% by weight of the polymer particles. The connection unit and crosslinker have at least one cyclic compound analogue including one or more non-flammable gas forming unit and phosphorous-containing unit. The amount of binder material is approximately from 2% to 60% by weight and the amount of polymer particles is approximately from 40% to 98% by weight. In addition, the pressure resistance of the consolidated crosslinked polymer particle coating ranges approximately from 0.5 to 8 MPa and the consolidated crosslinked polymer particle coating decomposes to release a non-flammable gas and phosphorous-containing molecules so as to prevent fire and thermal runaway at a temperature approximately from 300° C. to 500° C.

In one embodiment of the present invention, the shape of the polymer particles includes regular-shaped spherical particles, irregular-shaped particles, rods, tubes and tubules.

In one embodiment of the present invention, the thickness of the consolidated crosslinked polymer particle coating is approximately from 3 μm to 40 μm.

In one embodiment of the present invention, the binder is selected from a group consisting of polyvinylidene fluoride (PVDF), poly(acrylic acid) (PAA), polyurethane (PU), poly (methyl methacrylate) (PMMA), poly(vinylidene fluoride-hexafluoropropylene) (PVDF-HFP), polyacrylonitrile (PAN), poly(vinyl alcohol) (PVA), cellulose.

In one embodiment of the present invention, the non-flammable gas forming unit and phosphorous-containing unit further includes elements selected from P, N, Cl, S, O, F, Br, C, Si and Al.

In one embodiment of the present invention, the connection unit is made of cyclotriphosphazene.

In one embodiment of the present invention, the crosslinker is selected from a group consisting of sulfonyldiphenol, bisphenol AF and melamine.

In one embodiment of the present invention, the consolidated crosslinked polymer particle coating is fabricated by methods selected from ultrasonic spraying, electrostatic spraying, doctor blade coating, slit coating, micro gravure coating and spin coating.

In one embodiment of the present invention, the porosity of the consolidated crosslinked polymer particle coating is approximately from 25% to 80%.

In one embodiment of the present invention, the non-flammable gas includes nitrogen, ammonia, carbon dioxide, sulfur dioxide and water vapor.

In one embodiment of the present invention, the phosphorous-containing molecules includes phosphorous based free radicals (e.g., PO•, PO$_2$•, HPO$_2$•, etc.), phosphonic acid derivatives and polyphosphoric acid derivatives.

In one embodiment, it is provided a lithium-ion battery including the thermally-decomposable consolidated polymer particle encapsulated-electrode of the present invention.

BRIEF DESCRIPTION OF THE DRAWINGS

Embodiments of the present invention are described in more detail hereinafter with reference to the drawings.

DEFINITION

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

DETAILED DESCRIPTION

In the following description, many specific details are set forth for fully understanding of the present invention, but the present invention can also be implemented in other ways different from those described here, and those skilled in the art can make similar applications without departing from the scope of the present invention, Therefore the present invention should not be limited by the specific embodiments disclosed below.

The present invention provides an electrode encapsulated by a thermally-decomposable consolidated polymer particle for a lithium-ion battery. Advantageously, the consolidated crosslinked polymer particle coating forms a porous structure encapsulating the electrode and is able to decompose to release a non-flammable gas and phosphorous-containing molecules so as to prevent fire and thermal runaway at a temperature approximately from 300° C. to 500° C.

Figure 1:
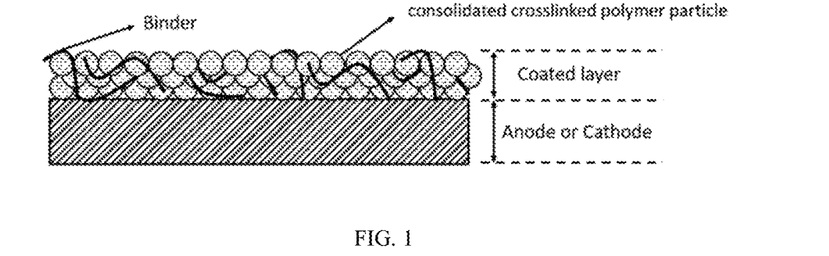
FIG. 1 illustrates the consolidated crosslinked polymer particle and the binder forming a coated layer encapsulating the electrode of the present invention.

As shown in FIG. 1, the consolidated crosslinked polymer particle and binder form a coated layer on at least one side of the electrode. The thickness of the coated layer, i.e., the consolidated crosslinked polymer particle, is approximately from 3 μm to 40 μm, and the diameter of the polymer particle is approximately from 0.05 μm to 8 μm with the shape including regular-shaped spherical particles, irregular-shaped particles, rods, tubes and tubules. This coated layer not only provides non-flammable gas and phosphorous-containing molecules to prevent fire and thermal runaway at higher temperature but also has good pressure resistance ranging approximately from 0.5 to 8 MPa. Methods for fabricating this coated layer encapsulating the electrodes include, but not limited to ultrasonic spraying, electrostatic spraying, doctor blade coating, slit coating, micro gravure coating and spin coating.

Figure 2:
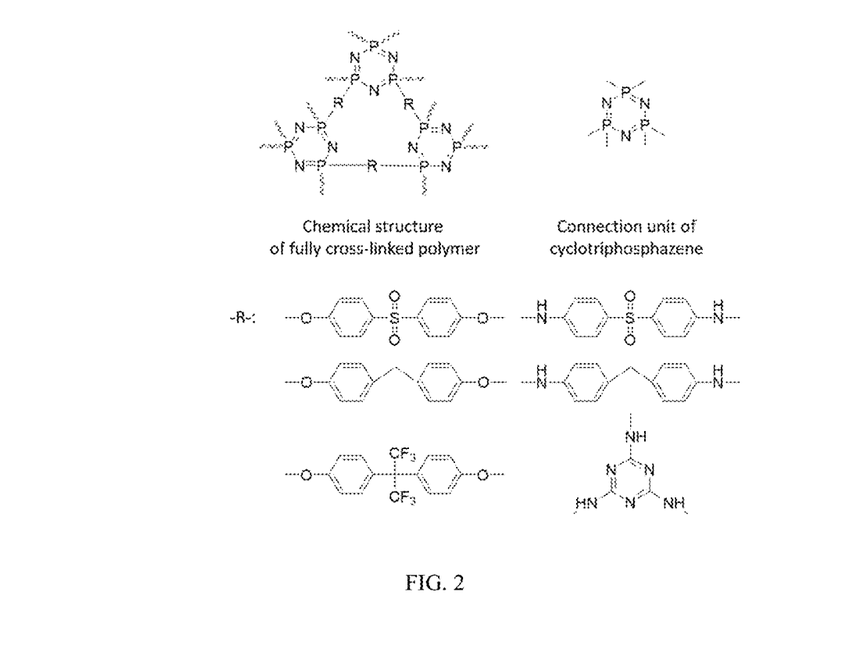
FIG. 2 shows the examples of connection units and crosslinkers.
Figure 3:
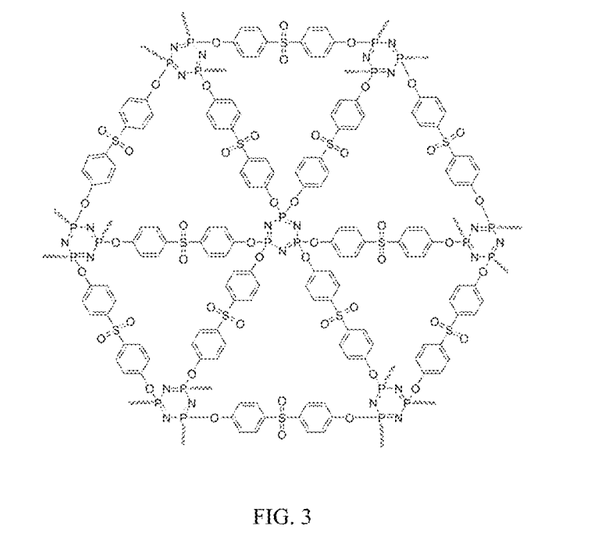
FIG. 3 illustrates the chemical structure of fully crosslinked polymer PCPS
Figure 4:
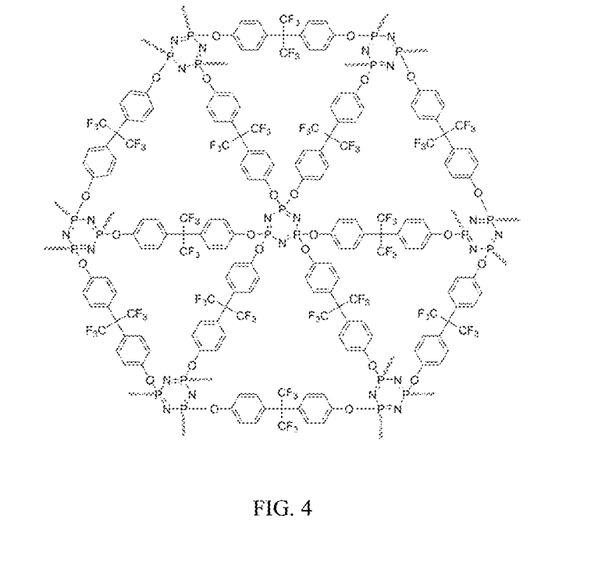
FIG. 4 illustrates the chemical structure of fully crosslinked polymer PCAF
Figure 5A:
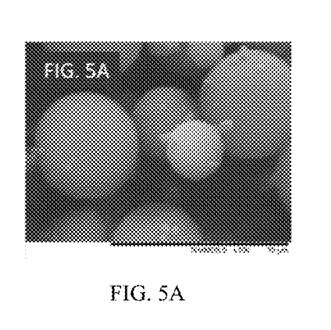
FIG. 5A shows the morphology of PCPS particles with an average particle size of approximately 5 μm.
Figure 5B:
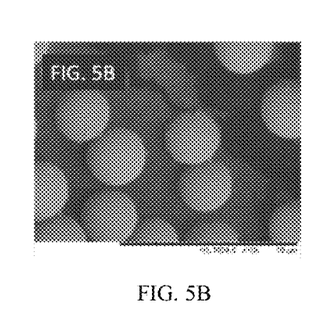
FIG. 5B shows the morphology of PCPS particles with an average particle size of approximately 3 μm.
Figure 5C:
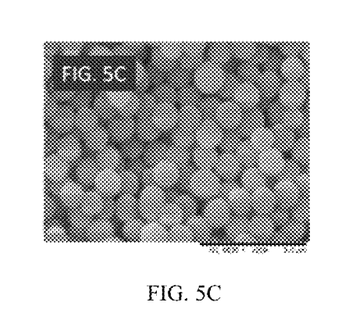
FIG. 5C shows the morphology of PCPS particles with an average particle size of approximately 0.6 μm.
Figure 6:
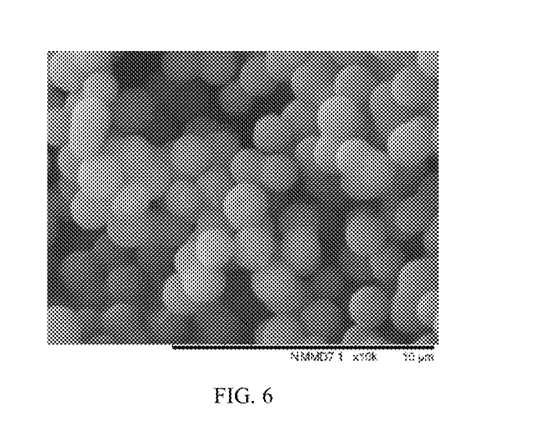
FIG. 6 shows the morphology of PCAF particles with the particle size approximately 2 μm.
Figure 7A:
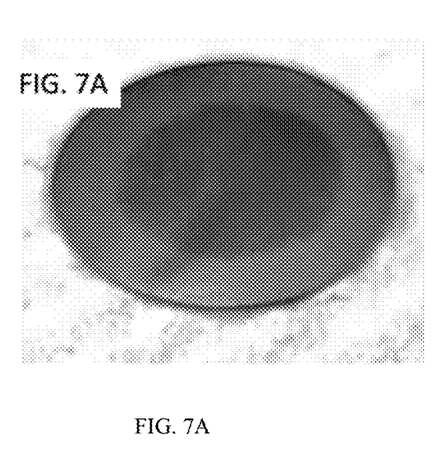
FIG. 7A shows the result of liquid electrolyte wetting test for graphite anode without PCPS coated layer.
Figure 7B:
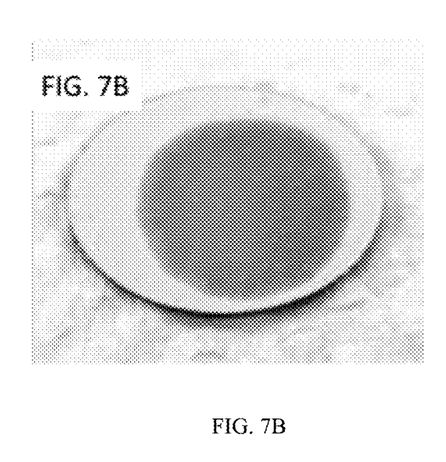
FIG. 7B shows the result of liquid electrolyte wetting test for graphite anode with PCPS coated layer (PCPS particle size: approximately 0.6 μm, coated layer thickness: 25 μm).

In addition, the electrode of the present invention comprises a cathode or an anode, wherein the cathode includes a lithium-based material selected from the group consisting of lithium manganese oxide (LMO), lithium cobalt oxide (LCO), lithium nickel Manganese cobalt oxide (NMC), and lithium iron phosphate (LFP) and the anode is selected from the group consisting of graphene, graphite, lithium titanate (LTO), a silicon compound, a silicon carbon composite, a tin-containing compound, and a tin-based composite. Meanwhile, the coated layer, i.e. the consolidated crosslinked polymer particle, comprises polymer particles in an amount of approximately from 40% to 98% by weight and at least one binder material in an amount of approximately from 2% to 60% by weight. The polymer particles include at least one connection unit and at least one crosslinker, in which the connection unit and the crosslinker have at least one cyclic compound analogue structure with one or more non-flammable gas forming unit and phosphorous-containing unit. Referring to FIG. 2, FIG. 3 and FIG. 4, the connection unit is cyclotriphosphazene which would react with at least one crosslinker selected from the group consisting of sulfonyldiphenol, bisphenol AF and melamine to form a plurality of fully cross-linked polymer particles. As shown in FIGS. 5A to 5C, it illustrates the morphology of the fully cross-linked polymer particles, poly(cyclotriphosphazene-c-sulfonyldiphenol (PCPS), with an average particle size ranging approximately from 0.6 μm to 5 μm. Furthermore, as shown in FIG. 6, it illustrates the morphology of the fully cross-linked polymer particles, poly(cyclotriphosphazene-c-Bisphenol AF (PCAF). The coated layer fabricated by the fully cross-linked polymer particles, PCPS or PCAF, will result in a porous structure with a porosity approximately from 25% to 80%. Advantageously, the porous structure of the coated layer is able to maintain good mechanical strength and conductivity. In addition, the porous coating layer provides with a good wetting performance of liquid electrolyte and waterproof property (shown in FIG. 7A and FIG. 7B), which could avoid deterioration of liquid electrolyte and reduce production of by-products due to the introduction of moisture in the battery system.

Figure 8:
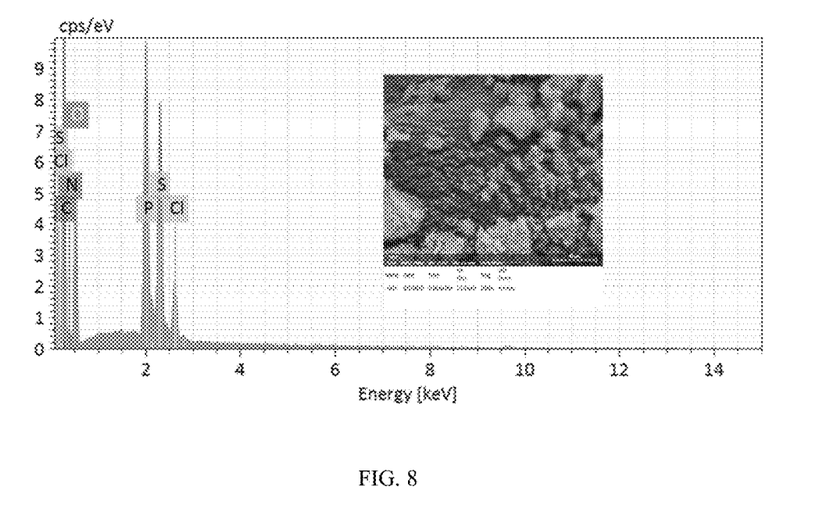
FIG. 8 illustrates the result of SEM-EDX for PCPS particles (particle size: approximately 0.6 μm).
Figure 9:
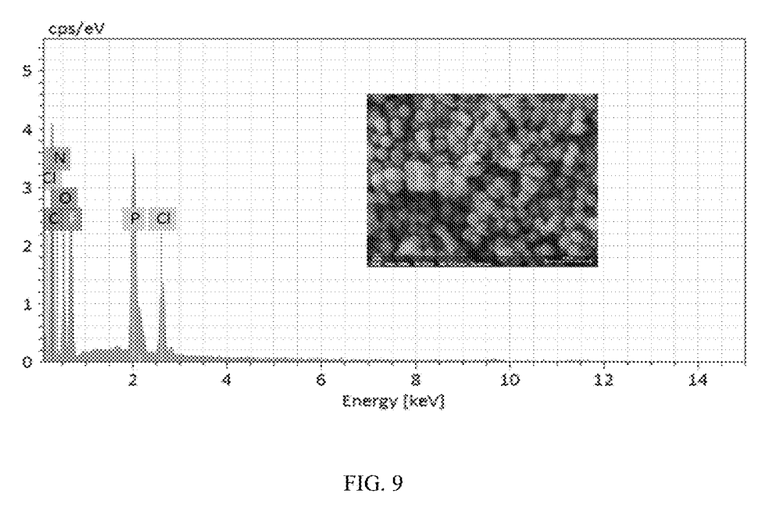
FIG. 9 illustrates the result of SEM-EDX for PCAF particles (particle size: approximately 2 1 μm).

In addition, due to the presence of the non-flammable gas forming unit and phosphorous-containing unit, the coated layer of the present invention improves the safety of the battery and is able to avoid thermal runaway at a temperature approximately from 300° C. to 500° C. The non-flammable gas forming unit and phosphorous-containing unit further include one or more elements, but not limited to, P, N, Cl, S, O, F, Br, C, Si and Al. As shown in FIG. 8 and FIG. 9, those elements are abundant in PCPS and PCAF particles. Polymer particles with these two types of units such as PCPS and PCAF particles in the present invention exhibit efficient flame retardancy due to following reasons: (1) high phosphorus content in the polymer particles is able to decompose and release certain amounts of phosphorus molecules such as phosphorous based free radicals (e.g., PO•, $PO_2$•, $HPO_2$•, etc.), phosphonic acid derivatives and polyphosphoric acid derivatives while overheating, which is able to eliminate and lower the flame of radicals such as H and OH so as to terminate the combustion reaction; (2) phosphorus compounds would form a non-flammable liquid film during decomposition so as to cover the electrode and isolate thereof from air, resulting in a flame-retardant effect; (3) some incombustible gases or non-flammable gases such as $NH_3$ and $N_2$, will be generated during the decomposition process so as to suppress the combustion by decreasing the concentration of the combustible gas(es).

Example

Figure 10:
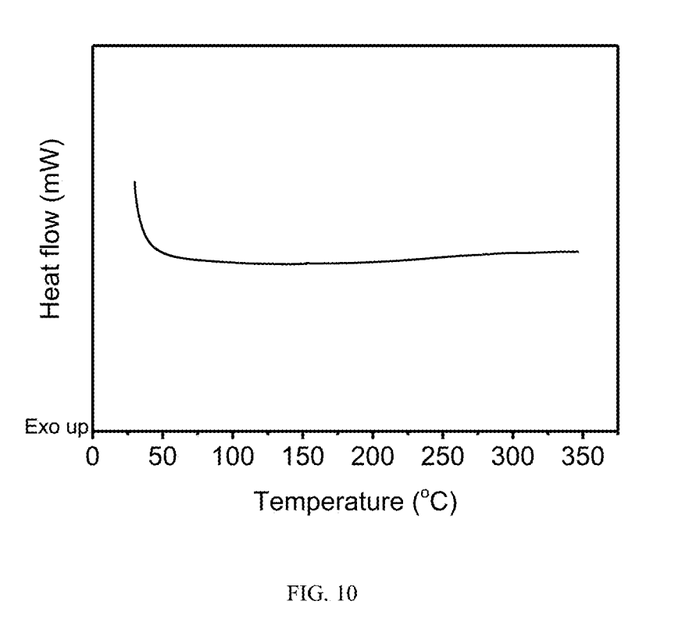
FIG. 10 shows the result of DSC for PCPS particles (particle size: approximately 0.6 μm)
Figure 11:
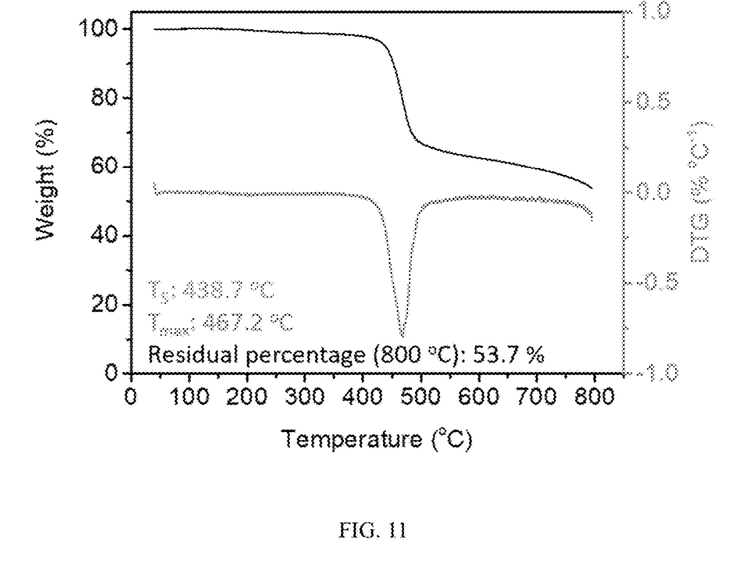
FIG. 11 shows the result of TGA for PCPS particles (particle size: approximately 0.6 μm)

In order to realize the thermal effects of the polymer particles, PCPS particles with an average particle size of approximately 0.6 μm have been heated gradually from room temperature to about 350° C. to obtain a DSC curve as shown in FIG. 10. The DSC curve in FIG. 10 presented barely significant thermal effects during the measurement, suggesting that PCPS particles were quite stable at various temperatures within the afore-mentioned range. Furthermore, thermogravimetric (TGA) analysis has also been performed to measure the thermal stability and the fraction of decomposable components by monitoring the weight change of the polymer particles of the present invention during the heating. As shown in FIG. 11, PCPS particles were decomposed at approximately from 400° C. to 500° C., resulting in weight loss of 46.3%.

Figure 12A:
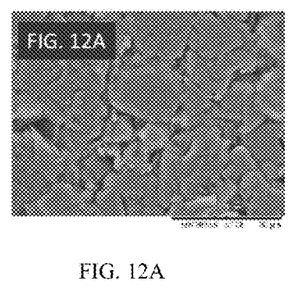
FIG. 12A shows the SEM photo for graphite anode without PCPS coated layer.
Figure 12B:
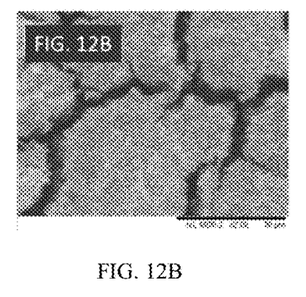
FIG. 12B shows the SEM photo for graphite anode with PCPS coated layer (PCPS particle size: approximately 0.6 μm, coated layer thickness: 25 μm)
Figure 12C:
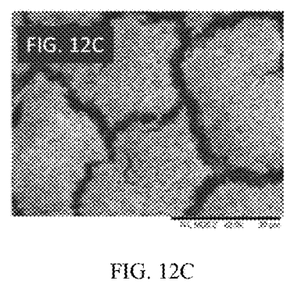
FIG. 12C shows the SEM photo for graphite anode with PCPS coated layer (PCPS particle size: approximately 0.6 μm, coated layer thickness: 30 μm)

Referring to FIGS. 12A, 12B and 12C, the SEM photos of graphite anode without coating, graphite anode coated with a layer of two different thicknesses of PCPS particles having 0.6 μm particle size, respectively, are provided (FIG. 12B: coated layer thickness: 25 μm; FIG. 12C: coated layer thickness: 30 μm).

Figure 13A:
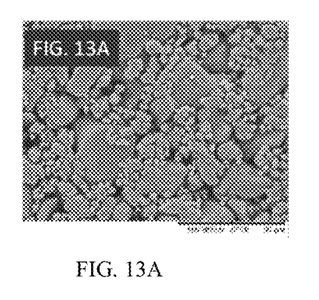
FIG. 13A shows the result of SEM for $LiCoO_2$ (LCO) cathode without PCPS coated layer.
Figure 13B:
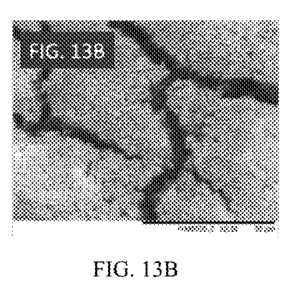
FIG. 13B shows the result of SEM for $LiCoO_2$ (LCO) cathode with PCPS coated layer (PCPS particle size: approximately 0.6 μm, coated layer thickness: 20 μm)
Figure 13C:
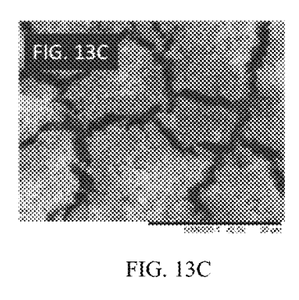
FIG. 13C shows the result of SEM for $LiCoO_2$ (LCO) cathode with PCPS coated layer (PCPS particle size: approximately 0.6 μm, coated layer thickness: 30 μm).

Referring to FIGS. 13A, 13B and 13C, the SEM photos of $LiCoO_2$ (LCO) cathode without coating, LCO anode coated with a layer of two different thicknesses of PCPS particles having 0.6 μm particle size, respectively, are provided (FIG. 13B: coated layer thickness: 20 μm; FIG. 13C: coated layer thickness: 30 μm).

Figure 14:
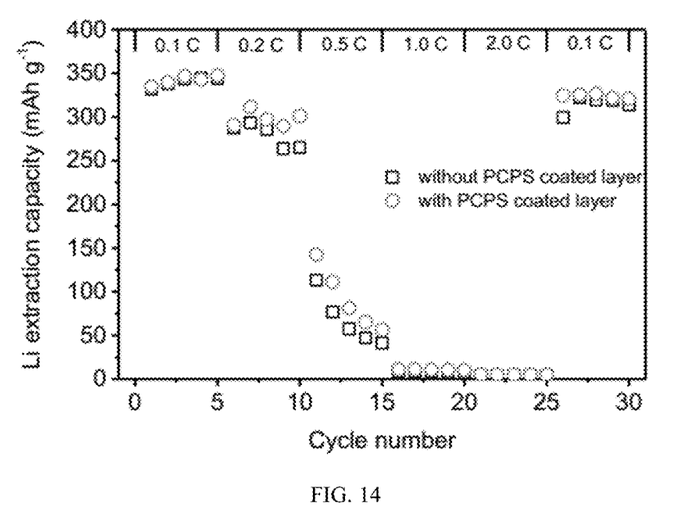
FIG. 14 illustrates the result of C-rate performance for assembling graphite/Li half cell.
Figure 15:
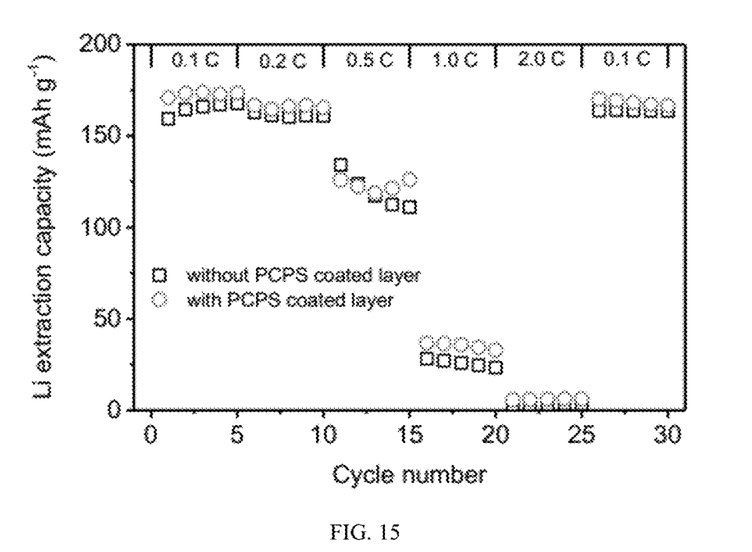
FIG. 15 illustrates the result of C-rate performance for assembling $LiCoO_2$ (LCO)/Li half cell.

The C-rate performance of a coin cell with or without the coated layer are also tested. As shown in FIG. 14, the C-rate performance of the assembly of graphite/Li half cell with the coated layer is similar to that without the coated layer, where the coin cell is 2032-type coin cell with 0.001V-2.0V; graphite mass loading: 11.7 mg $cm^{-1}$; separator thickness: 25 μm; electrolyte: 1 M $LiPF_6$ EC-DEC-DMC=1:1:1 (by volume); PCPS particle size: approximately 0.6 μm; and the thickness of the coated layer is approximately 27 μm (only for the assembly with the coated layer). Meanwhile, as shown in FIG. 15, the C-rate performance of the assembly of $LiCoO_2$ (LCO)/Li half cell with the coated layer is also similar to that without the coated layer, where the coin cell is 2032-type coin cell with 3.0V -4.35V; LCO mass loading: 25.5 mg $cm^{-1}$; separator thickness: 25 μm; electrolyte: 1 M $LiPF_6$ EC-DEC-DMC=1:1:1 (by volume); PCPS particle size: approximately 0.6 μm; and the thickness of the coated layer is approximately 28 μm (only for the assembly with the coated layer). These results suggested that the coated layer will not impact on the C-rate performance of the lithium-ion battery.

Furthermore, as shown in Table 1, nail penetration test has been performed on the pouch cell without or with a layer of PCPS particles in various thicknesses on the LCO cathode thereof, i.e., 20, 24, and 28 μm, wherein the pouch cell is 461045-type pouch cell with a volumetric energy density higher than 450 $WL^{-1}$, voltage: 3.0V-4.35V, fully charged (100% SOC), LCO mass loading: 25.5 $mgcm^{-1}$, graphite mass loading: 11.7 mg $cm^{-1}$, separator thickness: 7 μm, electrolyte: 1 M $LiPF_6$ EC-DEC-DMC=1:1:1 (by volume), PCPS particle size: approximately 0.6 μm.

Figure 16:
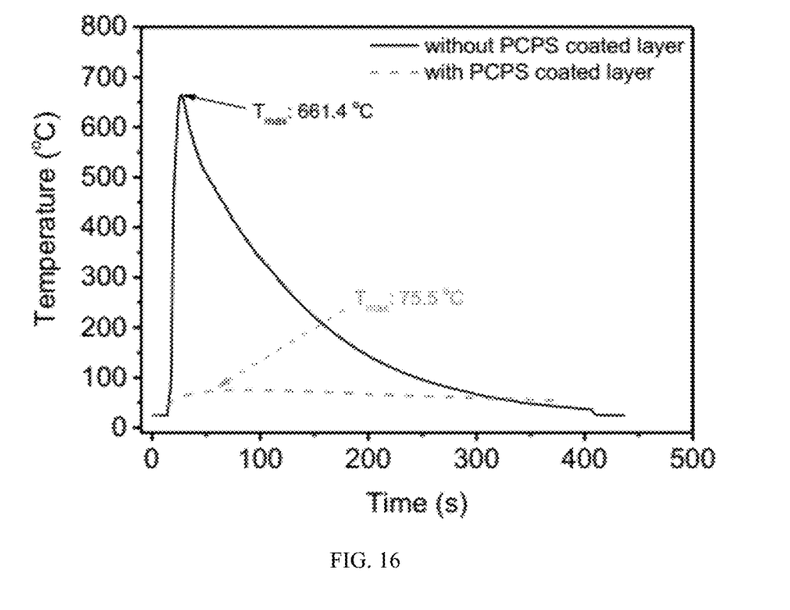
FIG. 16 shows the result of nail penetration test (curve of Temperature-Time) for the assembly of $LiCoO_2$ (LCO)/ graphite full cell. The thickness of the coated layer is approximately 20 μm on LCO cathode.
Figure 17:
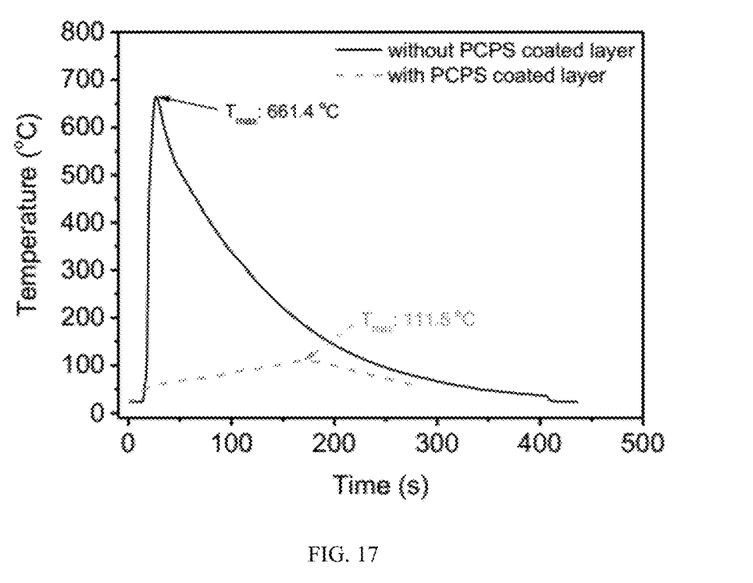
FIG. 17 shows the result of nail penetration test (curve of Temperature-Time) for the assembly of $LiCoO_2$ (LCO)/ graphite full cell. The thickness of the coated layer is approximately 28 μm on graphite anode.

Referring to FIG. 16 and FIG. 17, having the thickness of the PCPS coated layer in 20 μm on LCO cathode or 28 μm on graphite anode, the Tmax were 75.5° C. at approximately 50 to 100 seconds and 111.5° C. at approximately 150 to 200 seconds after the nail penetration test. However, the batteries without the PCPS coated layer experience dramatically temperature rises after penetrations, with the Tmax soaring up to 661.4° C.

TABLE 1

The results of nail penetration test for assembly of $LiCoO_2$ (LCO)/graphite full cell

| Sample | Thickness of PCPS coated layer (μm) | Leakage | Smoke | Fire | Results |
| --- | --- | --- | --- | --- | --- |
| With PCPS coated layer-1 | 28 | No | NO | NO | 3/3 pass |

TABLE 1-continued

The results of nail penetration test for assembly of LiCoO$_2$ (LCO)/graphite full cell

| Sample | Thickness of PCPS coated layer (μm) | Leakage | Smoke | Fire | Results |
|---|---|---|---|---|---|
| With PCPS coated layer-2 | 20 | No | NO | NO | |
| With PCPS coated layer-3 | 24 | No | NO | NO | |
| Without PCPS coated layer-1 | — | Yes | Yes | Yes | 0/3 pass |
| Without PCPS coated layer-2 | — | Yes | Yes | Yes | |
| Without PCPS coated layer-3 | — | Yes | Yes | Yes | |

As shown in Table 2, short circuit test has been further performed on the pouch cell without or with the coated layer on LCO cathode in various thicknesses, i.e. 14, 21, and 23 μm, wherein the pouch cell is 461045-type pouch cell with a volumetric energy density higher than 450 WL$^{-1}$, voltage: 3.0V-4.35V, fully charged (100% SOC), LCO mass loading: 25.5 mgcm$^{-1}$, graphite mass loading: 11.7 mg cm$^{-1}$, separator thickness: 7 μm, electrolyte: 1 M LiPF$_6$ EC-DEC-DMC=1:1:1 (by volume), PCPS particle size: approximately 0.6 μm.

Figure 18:
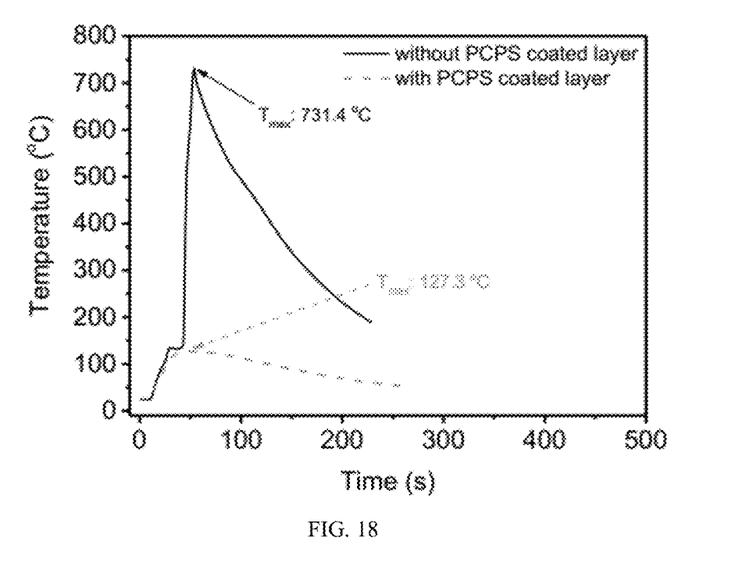
FIG. 18 shows the result of short circuit test (curve of Temperature-Time) for the assembly of $LiCoO_2$ (LCO)/ graphite full cell. The thickness of the coated layer is approximately 14 μm on graphite anode.
Figure 19:
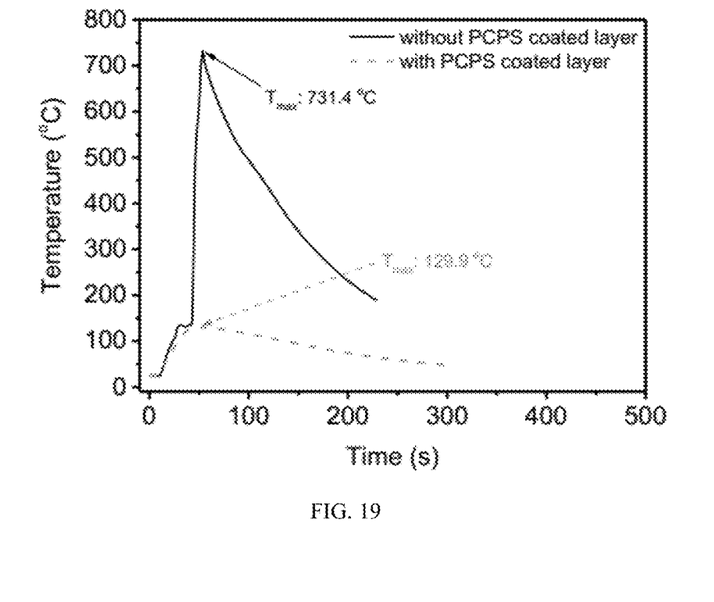
FIG. 19 shows the result of short circuit test (curve of Temperature-Time) for the assembly of $LiCoO_2$ (LCO)/ graphite full cell. The thickness of the coated layer is approximately 14 μm on LCD cathode.

Referring to FIG. 18 and FIG. 19, having the thickness of the PCPS coated layer in 14 μm on graphite anode and on LCO cathode, respectively, the Tmax were 127.3° C. at approximately 0 to 50 seconds and 129.9° C. at approximately 0 to 50 seconds after the short circuit test. However, the batteries without the PCPS coated layer experienced dramatic temperature rise after short circuit, with the Tmax up to 731.4° C. These results suggest that the internal short-cutting is efficiently inhibited due to the coated layer, thereby achieving a significant improvement in safety performance of the batteries.

TABLE 2

The results of short circuit test for assembly of LiCoO$_2$ (LCO)/graphite full cell

| Sample | Thickness of PCPS coated layer (μm) | Leakage | Smoke | Fire | Results |
|---|---|---|---|---|---|
| With PCPS coated layer-1 | 14 | No | NO | NO | 3/3 pass |
| With PCPS coated layer-2 | 21 | No | NO | NO | |
| With PCPS coated layer-3 | 23 | No | NO | NO | |
| Without PCPS coated layer-1 | — | Yes | Yes | Yes | 0/3 pass |
| Without PCPS coated layer-2 | — | Yes | Yes | Yes | |
| Without PCPS coated layer-3 | — | Yes | Yes | Yes | |

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

The invention claimed is:

1. A thermally-decomposable consolidated polymer particle coated electrode for a lithium-ion battery comprising:

an electrode selected from a cathode including a lithium-based material selected from the group consisting of lithium manganese oxide (LMO), lithium cobalt oxide (LCO), lithium nickel manganese cobalt oxide (NMC), and lithium iron phosphate (LFP), or an anode selected from the group consisting of graphene, graphite, lithium titanate (LTO), a silicon compound, a silicon carbon composite, a tin-containing compound, and a tin-based composite;

a consolidated crosslinked polymer particle coating forming a porous structure from 3 μm to 40 μm on at least one surface of the electrode, the consolidated crosslinked polymer particle coating consisting essentially of a crosslinked cyclotriphosphazene and a binder having the following structure:

wherein a crosslinker R is selected from one of the following:

the consolidated crosslinked polymer particle coating having a porosity of approximately 25% to 80% and wherein the at least one crosslinker R is in an amount of approximately from 25% to 50% by weight of the polymer particles, the diameter of the polymer particle is approximately from 0.05 μm to 8 μm;

the pressure resistance of the consolidated crosslinked polymer particle coating ranges approximately from 0.5 to 8 MPa; and wherein the consolidated crosslinked polymer particle coating decomposes to release a non-flammable gas and phosphorus-containing molecules to prevent fire and thermal runaway at a temperature from approximately 300° C. to 500° C.

2. The thermally-decomposable consolidated polymer particle coated electrode for a lithium-ion battery of claim 1, wherein the shape of the polymer particles includes regular-shaped spherical particles, irregular-shaped particles, rods, tubes and tubules.

3. The thermally-decomposable consolidated polymer particle coated electrode for a lithium-ion battery of claim 1, wherein the binder is selected from the group consisting of polyvinylidene fluoride (PVDF), Poly(acrylic acid) (PAA), Polyurethane (PU), poly(methyl methacrylate) (PMMA), poly(vinylidene fluoride-hexafluoropropylene) (PVDF-HFP), polyacrylonitrile (PAN), poly(vinyl alcohol) (PVA), cellulose.

4. The thermally-decomposable consolidated polymer particle coated electrode for a lithium-ion battery of claim 1, wherein the non-flammable gas forming unit and phosphorus-containing unit further includes elements selected from P, N, Cl, S, O, F, Br, C, Si and Al.

5. The thermally-decomposable consolidated polymer particle coated electrode for a lithium-ion battery of claim 1, wherein the consolidated crosslinked polymer particle coating is fabricated by methods selected from ultrasonic spraying, electrostatic spraying, doctor blade coating, slit coating, micro gravure coating and spin coating.

6. The thermally-decomposable consolidated polymer particle coated electrode for a lithium-ion battery of claim 1, wherein the non-flammable gas includes nitrogen, ammonia, carbon dioxide, sulfur dioxide and water vapor.

7. The thermally-decomposable consolidated polymer particle coated electrode for a lithium-ion battery of claim 1, wherein the phosphorus-containing molecules include phosphorus based free radicals (e.g., PO•, $PO_2$•, $HIPO_2$•, etc.), phosphonic acid derivatives and polyphosphoric acid derivatives.

8. A lithium-ion battery comprising the thermally-decomposable consolidated polymer particle coated electrode of claim 1.

9. The thermally-decomposable consolidated polymer particle coated electrode for a lithium-ion battery according to claim 1, wherein the crosslinked cyclotriphosphazene has the following chemical structure:

10. The thermally-decomposable consolidated polymer particle coated electrode for a lithium-ion battery according to claim 1, wherein the crosslinked cyclotriphosphazene has the following chemical structure.

11. The thermally-decomposable consolidated polymer particle coated electrode for a lithium-ion battery according to claim 1, wherein the electrode is an anode.

12. The thermally-decomposable consolidated polymer particle coated electrode for a lithium-ion battery according to claim 1, wherein the electrode is a cathode.

* * * * *